(12) United States Patent
Russell et al.

(10) Patent No.: US 7,876,340 B2
(45) Date of Patent: Jan. 25, 2011

(54) PULSE WIDTH MODULATION ALGORITHM

(75) Inventors: Andrew Ian Russell, Plano, TX (US); David Foster Lieb, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 846 days.

(21) Appl. No.: 11/696,033

(22) Filed: Apr. 3, 2007

(65) Prior Publication Data

US 2008/0247032 A1 Oct. 9, 2008

(51) Int. Cl.
*G09G 5/02* (2006.01)
(52) U.S. Cl. .................. 345/694; 345/204
(58) Field of Classification Search ......... 345/108–109, 345/204, 205, 206, 690–694
See application file for complete search history.

(56) References Cited

U.S. PATENT DOCUMENTS

| | | | |
|---|---|---|---|
| 5,663,749 A | 9/1997 | Farris | |
| 5,765,934 A | 6/1998 | Okamori et al. | |
| 6,201,521 B1 | 3/2001 | Doherty | |
| 6,648,475 B1 | 11/2003 | Roddy et al. | |
| 6,939,009 B2 | 9/2005 | Fischer et al. | |
| 6,980,197 B2 * | 12/2005 | Richards | 345/108 |
| 7,075,506 B2 | 7/2006 | Morgan | |
| 7,113,324 B2 | 9/2006 | Lee et al. | |
| 7,213,929 B2 | 5/2007 | Imade | |
| 7,417,782 B2 * | 8/2008 | Hagood et al. | 359/290 |
| 2007/0053074 A1 | 3/2007 | Krijn et al. | |
| 2008/0246705 A1 * | 10/2008 | Russell et al. | 345/82 |
| 2008/0246706 A1 * | 10/2008 | Russell et al. | 345/84 |
| 2008/0246891 A1 * | 10/2008 | Russell et al. | 348/740 |
| 2010/0067086 A1 | 3/2010 | Khan | |

* cited by examiner

*Primary Examiner*—Nitin Patel
(74) *Attorney, Agent, or Firm*—Charles A. Brill; Wade James Brady, III; Frederick J. Telecky, Jr.

(57) ABSTRACT

In display systems employing spatial light modulators, the OFF-state light from OFF-state pixels of the spatial light modulator can be captured and directed back to the pixels of the spatial light modulator so as to recycle the OFF-state light in the display system. Bitplanes derived from the desired image to be produced are calibrated to include the recycled off-state light to properly produce the desired image using the display system.

20 Claims, 8 Drawing Sheets

PULSE WIDTH MODULATION ALGORITHM

CROSS REFERENCE TO RELATED CASES

This U.S. patent application is related to U.S. patent application "OFF-STATE LIGHT RECAPTURING IN DISPLAY SYSTEMS EMPLOYING SPATIAL LIGHT MODULATORS" to Russell et al., Ser. No. 11/696,044, and "A PULSE WIDTH MODULATION ALGORITHM" to Russell, Ser. No. 12/062,266, both filed on the same day as this patent application; and the subject matter of each being incorporated herein by reference in its entirety.

TECHNICAL FIELD

The technical field of the examples to be disclosed in the following sections relates to the art of display systems, and more particularly, to pulse-width-modulation techniques for use in display systems employing spatial light modulators.

BACKGROUND

In current imaging systems that employ spatial light modulators composed of individually addressable pixels, a beam of incident light is directed to the pixels of the spatial light modulator. By setting the pixels at an ON state, the incident light is modulated onto a screen so as to generate bright image pixels on the screen, wherein such modulated light is referred to as the ON-state light; and the pixels at the ON state are referred to as ON-state pixels. By setting the pixels at an OFF state, the incident light is modulated away from the screen so as to cause dark pixels on the screen, wherein such modulated light is referred to as OFF-state light; and the pixels at the OFF state are referred to as OFF-state pixels. For obtaining a high contrast ratio, the OFF-state light is dumped or discarded by the imaging systems, which on the other hand, reduces the optical efficiency of the imaging system.

SUMMARY

In one example, a method for displaying an image is disclosed herein. The method comprises: directing a beam of incident light onto an array of pixels of a spatial light modulator, wherein each pixel is capable of being operated at a first state and a second state; modulating the beam of incident light into a first portion of light by pixels at the first state and a second portion of light by the pixels at the second state based on a set of bitplanes, further comprising: displaying each bitplane by the pixels for a time period that is determined based on a number of pixels in said each bitplane that cause the pixels of the spatial light modulator to the second state; directing the first portion of light from the spatial light modulator onto a display target, and the second portion of light from the spatial light modulator away from the display target; and recycling the second portion of light back to the pixels of the spatial light modulator.

In another example, a device for use in a display system employing a spatial light modulator having an array of pixels with each pixel capable of being operated at a first state and a second state that is different from the first state is disclosed. The device comprises: a data formatter capable of converting a set of pixel data of an input image into a set of bitplanes; an average pixel calculator having an input connected to the input image for calculating an average pixel value of the input image; a real-time bit counter having an input connected to the bitplanes for calculating a number of pixels in each bitplane that cause the pixels of the spatial light modulator to be at the second state; a clock speed calculator having a set of inputs connected to an output of the average pixel value calculator and an output of the real-time bit counter for calculating a clock speed based on the calculated average pixel data value and said number of pixels in said each bitplane; a clock speed adjustor having an input connected to an output of the clock speed calculator and an input coupled to a sequence of clock signals of the spatial light modulator provided by a clock of the display system; and a controller having an input connected to an output of the clock speed adjustor for operating the spatial light modulator at the adjusted clock speed.

In yet another example, a display system is disclosed. The system comprises: a light source capable of providing a light beam; a spatial light modulator having an array of individually addressable pixels each being capable of modulating the light beam into a first portion of light when said each pixel is at a first state and a second portion of light when said each pixel is at a second state based on a set of bitplanes; a light recycling mechanism capable of recycling the second portion of light back to the spatial light modulator; and a system controller for controlling an operation of the spatial light modulator, further comprising: a data formatter capable of converting the pixel data of the input image into the set of bitplanes; an average pixel calculator having an input connected to the input image for calculating an average pixel value of the input image; a real-time bit counter having an input coupled to the bitplanes for calculating a number of pixels in each bitplane that cause the pixels of the spatial light modulator to be at the second state; a clock speed calculator having a set of inputs connected to an output of the average pixel value calculator and an output of the real-time bit counter for calculating a clock speed based on the calculated average pixel data value and said number of pixels in each said bitplane; a clock speed adjustor having an input connected to an output of the clock speed calculator and an input coupled to a sequence of clock signals of the spatial light modulator provided by a clock of the display system; and a controller having an input connected to an output of the clock speed adjustor for operating the spatial light modulator at the adjusted clock speed.

In still yet another example, a method for displaying a sequence of image frames using an array of individually addressable pixels of a spatial light modulator is disclosed. The method comprises: deriving a set of bitplanes from each image frame, wherein each bitplane has an index representing a relative position of the bitplane in the set of bitplanes; modulating, by the pixels of the spatial light modulator, a beam of incident light into ON-state and OFF-state light based on the bitplanes, further comprising: displaying a first bitplane of a first set of bitplanes derived from a first image frame of the image sequence is displayed by the pixels of the spatial light modulator for a first time period; displaying a second bitplane of a second set of bitplanes derived from a second image frame of the image sequence is displayed by the pixels of the spatial light modulator for a second time period; and wherein the first and second bitplanes have the same index; and the first and second time periods are different; directing the OFF-state light away from a display target and the ON-state light onto the display target; and re-routing the OFF-state light back to the pixels of the spatial light modulator.

BRIEF DESCRIPTION OF DRAWINGS

FIG. 6 and FIG. 7 schematically illustrates a method for calculating off-state pixels in bitplanes that are to be displayed by the spatial light modulator whose pixels are divided into reset groups; wherein FIG. 6 illustrates the array of pixels of the spatial light modulator divided into reset groups; and FIG. 7 illustrates an exemplary bit-counter for calculating off-state pixels based on reset groups.

DETAILED DESCRIPTION OF SELECTED EXAMPLES

In a typical existing display system employing a spatial light modulator, ON-state light from ON-state pixels of the spatial light modulator propagates towards the screen of the display system so as to generate a bright image pixel on the screen. The off-state light from off-state pixels of the spatial light modulator travels away from the screen so as to result in a dark pixel on the screen. Such off-state light is often dumped or discarded by the display system, which reduces the optical efficiency of the display system.

As an aspect of this disclosure, a mechanism for recycling the off-state light is provided, as will be discussed in the first part of this disclosure. Because most current display systems employing spatial light modulators operate based on bit-planes; and the bitplanes may cause different number of pixels at the OFF-state, the intensity of the recycled off-state light varies over time or over bitplanes. Such variation, in turn, causes distortion of the displayed image. This problem can be solved by displaying the bitplanes derived from the desired image at dynamically adjusted clock speed, as will be discussed in the second part of this disclosure.

Off-State Light Recycling Mechanism

The off-state light from off-state pixels at a time can be captured and rerouted back to the pixels of the spatial light modulator. The rerouted off-state light, when illuminating the on-state pixels of the spatial light modulator, is converted to the ON-state light that can be projected to the screen so as to increase the brightness of the projected image. When illuminating the off-state pixels, the rerouted off-state light will be re-captured and then rerouted again to the pixels of spatial light modulator. This off-state light capturing and rerouting process is referred to as "off-state light recycling." A device having the capability of off-state light recycling in display systems is referred to as an off-state light recycling mechanism.

Figure 1:
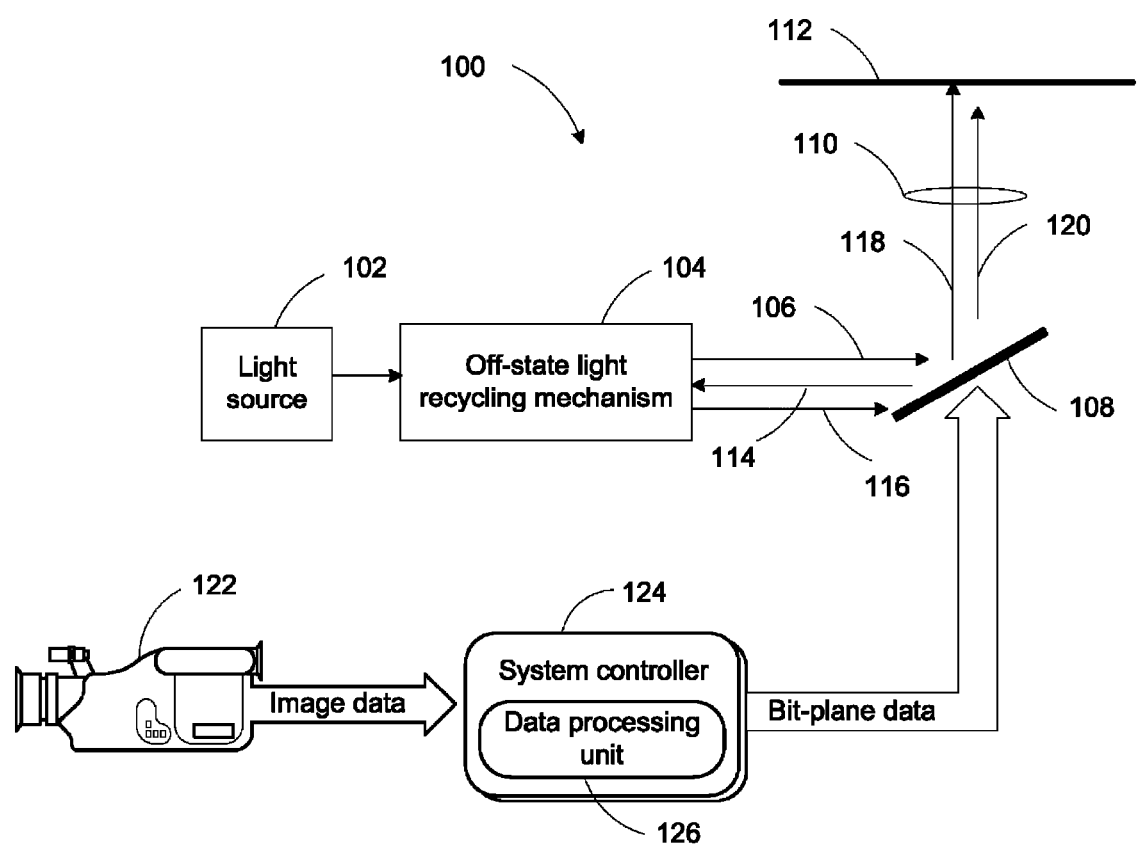
FIG. 1 diagrammatically illustrates a diagram of an exemplary display comprising an off-state light recycling mechanism.

As an example, FIG. 1 diagrammatically illustrates an exemplary display system in which an off-state recycling mechanism is implemented. In this example, display system 100 comprises light source 102, off-state light recycling mechanism 104, spatial light modulator 108, projection lens 110, display target 112, and system controller 124 that further comprises data processing unit 126. Multimedia source 122, such as video and image sources, is connected to the system controller for providing multimedia signals. It is noted that the multimedia source may or may not be a member of the display system. The display target (112) can be a screen on a wall or the like, or can be a member of a rear projection system, such as a rear projection television. In fact, the display system can be any suitable display system, such as a front projector, a rear projection television, or a display unit for use in other systems, such as mobile telephones, personal data assistants (PDAs), hand-held or portable computers, camcorders, video game consoles, and other image displaying devices, such as electronic billboards and aesthetic structures.

Light source 102 provides light for the imaging system. The light source may comprise a wide range of light emitting devices, such as lasers, light-emitting-diodes, arc lamps, devices employing free space or waveguide-confined nonlinear optical conversion and many other light emitting devices. In particular, the light source can be a light source with low etendue, such as solid state light emitting devices (e.g. lasers and light-emitting-diodes (LEDs)). When solid-state light emitting devices are used, the light source may comprise an array of solid-state light emitting devices capable of emitting different colors, such as colors selected from red, green, blue, and white. Because a single solid-state light emitting device generally has a narrow characteristic bandwidth that may not be optimal for use in display systems employing spatial light modulators, multiple solid-state light emitting devices can be used for providing light of each color so as to achieve optimal bandwidth for specific display systems. For example, multiple lasers or LEDs with slightly different characteristic spectra, such as 20 nm or less characteristic wavelength separation, can be used to produce a color light such that the characteristic spectra of the multiple lasers or LEDs together form an optimal spectrum profile of the display system. Exemplary laser sources are vertical cavity surface emitting lasers (VCSEL) and Novalux™ extended cavity surface emitting lasers (NECSEL), or any other suitable laser emitting devices.

Spatial light modulator 108 comprises an array of individually addressable pixels for spatially modulating the incident light onto or away from projection lens 110 that projects the modulated light onto screen 112 so as to reproduce images. The spatial light modulator may comprise pixels of many different natures, such as reflective and deflectable micromirrors and liquid-crystal-on-silicon (LCOS) devices. The pixels can be operated using binary or non-binary modes. In the binary mode, each pixel is switched between an ON and OFF state. At the ON state, each pixel modulates the incident light onto the projection lens (110). At the OFF state, each pixel modulates the incident light away from the projection lens. The ON-state light arrives at the screen (112) so as to construct the desired image; and the OFF-state is recycled by off-state light recycling mechanism 104 and redirected to the spatial light modulator, which will be discussed afterwards. The pixels of the spatial light modulator alternatively can be operated at a non-binary mode, such as an analog mode wherein multiple intermediate states are defined between an ON and OFF state; and the intermediate states may or may not be continuous between the ON and OFF states. In either binary or non-binary operation mode, color and gray images can be produced using a pulse-width-modulation technique, an example of which will be discussed afterwards. Another exemplary pulse-width-modulation technique is set forth in "A Pulse Width Modulation Algorithm," to Russell, filed on the same day as this patent application, the subject matter of which is incorporated herein by reference in its entirety.

OFF-state light recycling mechanism 104 is optically coupled to the propagation path of the off-state light that is modulated from the pixels of the spatial light modulator (108) such that the off-state light from the pixels at the OFF state of the spatial light modulator can be recaptured by the off-state light recycling mechanism. For redirecting the recaptured off-state light back to the pixels of the spatial light modulator, the OFF-state light recycling mechanism has a light exit end that is aligned to the propagation path of the incident light to the pixels of the spatial light modulator.

In the example illustrated in FIG. 1, incident light 106 from the light source is directed to spatial light modulator 108 that modulates the incident light (116) into ON-state light 107 and OFF-state light 114. The ON-state light travels towards projection lens 110; and is projected onto screen 112 by projection lens 110. OFF-state light 114 is recaptured by OFF-state light recycling mechanism 104 that is capable of converting the recaptured OFF-state light into incident light 116 and redirecting light 116 to illuminate pixels of spatial light modulator 108. At the spatial light modulator, incident light 116 may be modulated into ON-state light 117 that is collected by projection lens 110 and the OFF-state light that is recaptured by the off-state light recycling mechanism (104).

Because the OFF-state light from the spatial light modulator can be recaptured and redirected to the spatial light modulator, this recycling process improves the brightness of images produced on the screen. Such brightness improvement can be mathematically described as brightness gain as expressed in equation 1:

$$I = I_o G = I_o \frac{1}{1 - \varepsilon(1-x)} \quad \text{(Eq. 1)}$$

In equation 1, G is the brightness gain due to OFF-state light recycling; I is the illumination intensity of light arriving at the screen including the recycled OFF-state light; and $I_o$ is the illumination intensity of light arriving at the screen without OFF-sate light recycling. $\varepsilon$ is the OFF-state light recycling efficiency that is defined as the fraction of the OFF-state light that re-illuminates the pixels of the spatial light modulator after a recycling process, compared to the total amount of OFF-state light to be recycled by the recycling process. x is the normalized number of ON-state pixels of the spatial light modulator at a time (e.g. during a bitplane time). Specifically, x can be expressed as equation 2:

$$x = \frac{N_{ON}}{N_{total}} \quad \text{(Eq. 2)}$$

wherein $N_{ON}$ is the number of ON-state pixels at a time; and $N_{total}$ is the total number of pixels involved in modulating the incident light. It is noted that $N_{total}$ may or may not be the total number of pixels of the spatial light modulator, especially when the spatial light modulator comprises active and inactive pixel areas. Pixels in inactive pixel areas of spatial light modulators are those pixels whose states in image display operations are independent from the data (e.g. bitplane data) derived from desired images; whereas pixels in active pixel areas are those whose states are associated with or determined by the image data.

Recycling efficiency $\varepsilon$ is primarily determined by the optical design of the off-state light recycling mechanism and the optical coupling of the off-state light recycling mechanism to the display system, particularly to the propagation path of the OFF-state light from the spatial light modulator and the propagation path of the light incident to the spatial light modulator. Ideally, $\varepsilon$ is 100%. In practice, $\varepsilon$ may be less than 100% due to imperfect optical coupling of the off-state light recycling mechanism to the propagation path of the off-state light from the spatial light modulator and/or to the propagation path of the incident light to the spatial light modulator and/or due to light leakage from imperfect optical design of the off-state light recycling mechanism. To maximize the brightness gain, it is preferred that $\varepsilon$ is maximized. In other examples, however, maximizing off-state light recycling may be impeded by other preferred system features, which results in balance between off-state recycling and the preferred features. For example, the off-state light recycling mechanism and/or the system design is desired to be cost-effective or desired to be volume compact or other reasons, poor $\varepsilon$ may be selected. In any instances, it is preferred that $\varepsilon$ is 10% or more, such as 20% or more, 30% or more, 40% or more, 50% or more, 60% or more, and 70% or more. As an example, table 1 shows the brightness gain achieved from different fractions of ON-state pixels (which can be converted to the number of ON-state pixels using equation 2) by assuming that the recycling efficiency $\varepsilon$ is 60%.

TABLE 1

| | % of ON-state pixels | | | | | | | | | | |
|---|---|---|---|---|---|---|---|---|---|---|---|
| | 0 | 10 | 20 | 30 | 40 | 50 | 60 | 70 | 80 | 90 | 100 |
| Brightness gain | 2.5 | 2.17 | 1.92 | 1.72 | 1.56 | 1.43 | 1.32 | 1.22 | 1.14 | 1.06 | 1 |

Figure 3:
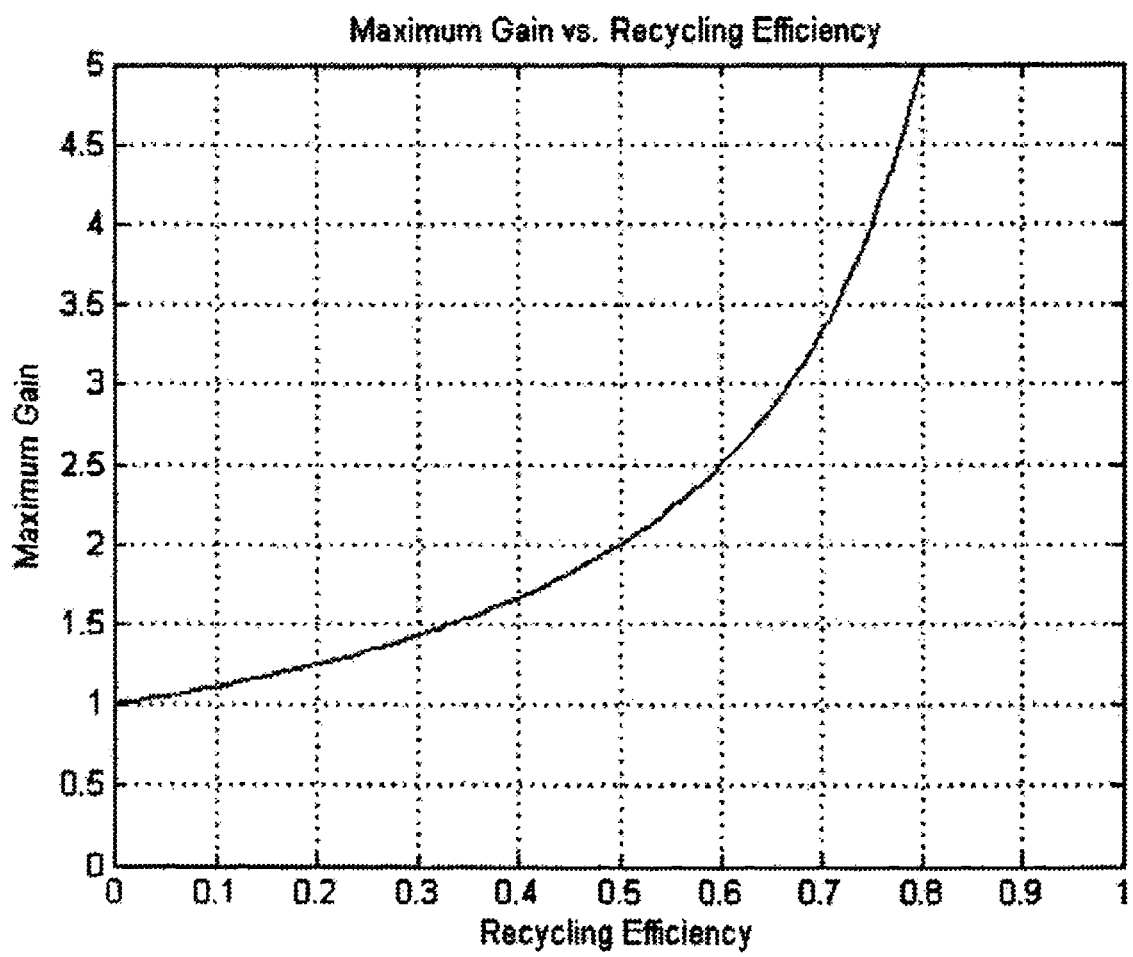
FIG. 3 shows a diagram of the maximum gain vs. the recycling efficiency due to off-state light recycling.

An exemplary variation of the maximum gain with the recycling efficiency is presented in FIG. 3. The diagram in FIG. 3 assumes that all pixels of the spatial light modulator are at the OFF state. Accordingly, equation 1 is reduced to equation 3 with the recycling efficiency being the variable as shown in the following:

$$G = \frac{1}{1 - \varepsilon} \quad \text{(Eq. 3)}$$

As can be seen in FIG. 3, the maximum gain is 1 when the recycling efficiency $\epsilon$ is 0; and the maximum gain is 5 when $\epsilon$ is 0.8.

Figure 4:
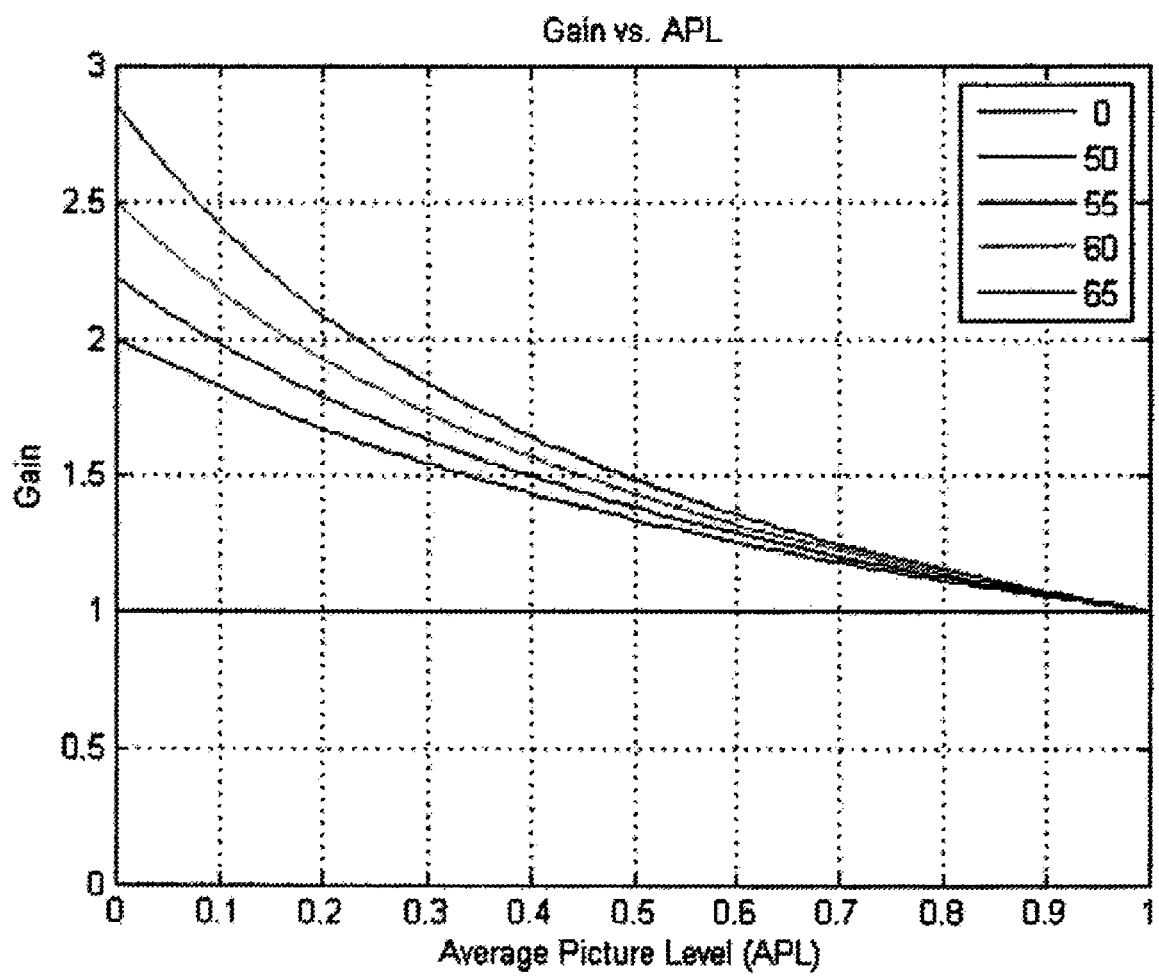
FIG. 4 shows a diagram of the gain vs. the average picture-level (APL) for different off-state light recycling efficiencies.

Because the gain is due to the off-state recycling, the amount of gain obtained through off-state recycling depends on the number of off-state pixels of the spatial light modulator during the recycling process. As an example, FIG. 4 presents a diagram of the gain vs. the average-picture-level (APL) in a bitplane with different curves representing different recycling efficiencies. The APL is defined as the fraction of the ON-state pixel data (e.g. the total number of "1") in a bitplane. As can be seen in FIG. 4, gain increases as APL decreases. A substantially white image has least gain, and thus least brightness boost; whereas a substantially dark image has the most gain, and thus the most brightness boost.

In addition to the brightness improvement as discussed above, the off-state light recycling has many other benefits. For example, the off-state recycling can also be used to increase the lifetime of the light source of the imaging system and/or to reduce the power consumption of the imaging system. Specifically, the light source can be operated as a lower power, as compared to imaging operations without off-state light recycling, during imaging operations but without sacrificing the brightness of the reproduced images. Operating the light source at reduced power certainly helps to increase lifetime of the light source, especially solid-state light sources, such as lasers and LEDs. Moreover, reduced power also reduces heat generated by the light source, which in turn increases lifetime of other components in the system by for example, reducing the commonly existing aging effect.

Figure 2:
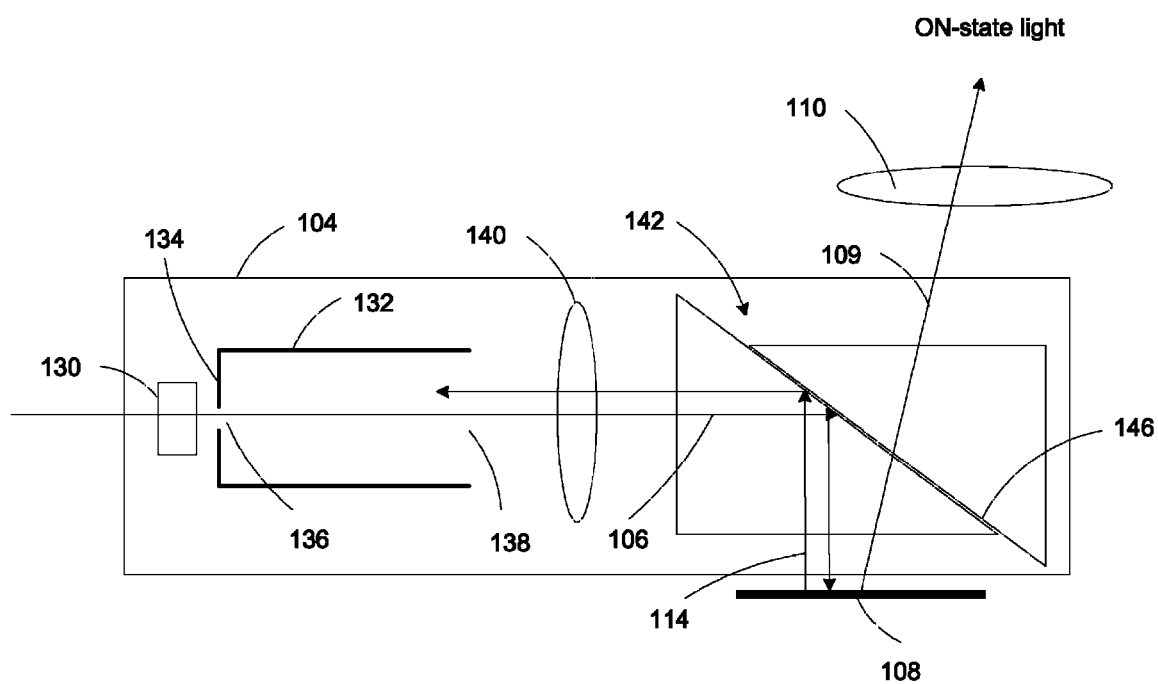
FIG. 2 is a block diagram illustrating an exemplary off-state light recycling mechanism illustrated in FIG. 1.

The off-state light recycling mechanism (104) as illustrated in FIG. 1 can be implemented in many possible ways, one of which is schematically illustrated in FIG. 2. Referring to FIG. 2, off-state light recycling mechanism 104 comprises optical diffuser 130, optical integrator 132, condensing lens 140, and prism assembly 142. For illustrating the relative positions of the off-state light recycling mechanism in the imaging system, spatial light modulator 108 and projection lens 110 in FIG. 1 are also shown in the figure.

Optical diffuser 130 is provided herein for homogenizing the light beam incident thereto and transforming the incident light beam, especially narrow-band or narrow-angle light beams from solid-state light emitting devices, into light beams with pre-determined illumination field profiles. A narrow-angle light beam is referred to a light beam with a solid-angle extension of 5 degrees or less, such as 2 degrees or less, 1 degree or less, 0.5 degree or less, and 0.2 degree or less. The homogenization capability of the optical diffuser is enabled by randomly or regularly deployed scattering centers. The scattering centers can be located within the body of the diffuser or in (or on) a surface(s) of the diffuser, which constitute the features responsible for directing the incident light into various spatial directions within the spread of the optical diffuser. Depending upon different locations of the scattering centers, the optical diffuser can be a volume optical diffuser where the scattering centers are within the bulk body of the diffuser, or a surface diffuser where the scattering centers are on the surface of the bulk body of the diffuser. In one example, the optical diffuser can be a surface diffuser, such as a standard engineered diffuser. Even though not required, the optical diffuser can be used when the light source (102 in FIG. 1) employs solid state (or narrow band) light sources. In other examples, such as the light source uses arc lamps, the optical diffuser may be replaced by an optical lens, such as a condensing lens, which is not shown in the figure. A lens combined with smaller angle or spatial diffusers can also be used.

The optical integrator (132) comprises opening 136 formed in end wall 134 of the optical integrator. Side wall 134 has interior surface coated with a reflective layer for reflecting the light incident thereto. In particular, the interior surface of side wall 134 is used to reverse the direction of the incident light such that the off-state light recaptured at the other end (138) of optical integrator 132 can be bounced back to travel towards the spatial light modulator. For this purpose, the reflective layer coated on the interior surface of side wall 134 can be a totally-internally-reflecting (TIR) surface for the OFF-state light.

Opening 136 provided in side wall 134 is designated for collecting the light beams from the light source and directing the collected light towards the spatial light modulator (108). Accordingly, opening 136 is optically aligned to the propagation path of the incident light from the light source, as illustrated in the figure.

Because the opening (136) is provided to collect the incident light and the opening is in the side wall 134 that is designated to bounce the recaptured off-state light, the opening has a preferred dimension such that off-state light leakage from the opening is minimized while collection of the incident light from the light source is maximized. The opening may have a dimension that matched to the dimension of the light incident thereto, such as the dimension of the illumination field of the light beam at the location of side wall 134. As an example, the width or height of the opening can be 1 mm or less, such as 0.5 mm or less, and 0.2 mm or less. The opening may have any desired shape, such as circle, rectangle, and square.

The other end (138) of optical integrator 132 is designated to capture the off-state light from the spatial light modulator (108). To maximize the capturing of the off-state light, side 138 of optical integrator 132 is substantially open; and the opened portion is optically aligned to the propagation path of the off-state light from the spatial light modulator. In particular, the opening portion of side 138 can be optically aligned to the illumination field of the off-state light at the location of side 138. Even though it is shown in the figure that side 138 and side 136 are substantially parallel and substantially have the same dimension, it is not required. In other examples, side 138 may have a shape and/or a dimension different from that of side 134, in which instance, optical integrator 132 can be tapered or extended from one end (e.g. side 134) to the other (e.g. side 138). Alternatively, optical integrator 132 can be assembled with another optical integrator or a suitable optical element (e.g. lens) such that capturing the off-state light from the spatial light modulator can be maximized.

Optical integrator 132 may have a solid body, such as a body filled with an optical material (e.g. glass) that is transmissive to the incident light. The optical integrator may alternatively comprise a hollowed body, such as an empty space surrounded by multiple reflective walls, one end-side wall 134, and the other end-side wall 138, as discussed above.

The incident light (106), including the light from the light source and the recycled light from the off-state light recycling mechanism, is then guided to the spatial light modulator by condensing lens 140 and prism assembly 142. For properly directing the incident light onto the pixels of the spatial light modulator (108) and spatially separating the ON-state and OFF-state light, the prism assembly employs TIR surface 146. Specifically, TIR surface 146 is optically disposed such that the incident light can be reflected to the spatial light modulator at a pre-determined direction; the off-state light (114) from the pixels at the OFF state can be directed towards side 138 of the off-state light recycling mechanism; and the ON-state light (109) from the spatial light modulator can travel through the TIR surface towards the projection lens (110). These can be achieved by aligning the TIR surface (146) such that the incident light and OFF-state light impinge the TIR surface at incident angles equal to or greater than the critical angle of the TIR surface; whereas the ON-state light impinges the TIR surface at an incident angle less than the critical angle of the TIR surface.

Condensing lens 140 is provided to form a proper illumination field on the TIR surface (146) such that the image of such illumination field projected on the spatial light modulator by the TIR surface has a proper optical profile. For example, the profile has an illumination area matching the pixel area of the spatial light modulator and/or the illumination intensity is substantially uniform across the pixel area. A proper optical profile can be achieved by adjusting the relative positions of condensing lens 140, TIR surface 146, and spatial light modulator 108.

In the example shown in FIG. 2, optical integrator 132 is disposed on the optical path of the light from the light source. A benefit of this configuration is that the recycled off-state light can be re-directed to the spatial light modulator along the same propagation path of the incident light from the light source, thus simplifying the optical design. In other alternative examples, the optical integrator can be disposed such that the optical axis of the optical integrator is not aligned to the incident light path. In this instance, opening 136 may not be formed. Moreover, alternative to using a prism assembly with a TIR surface as shown in FIG. 2, the off-state recycling mechanism can employ an optical fiber or other suitable optical devices.

It is noted that FIG. 1 and FIG. 2 illustrate only one of many possible off-state light recycling mechanisms and display systems using the same. Other variations are also applicable, such as those set forth in U.S. patent application "OFF-STATE LIGHT RECAPTURING IN DISPLAY SYSTEMS EMPLOYING SPATIAL LIGHT MODULATORS" to Russell et al., filed on the same say as this US patent application, the subject matter of which is incorporated herein by reference in its entirety.

Pulse-Width-Modulation Algorithm

For properly reproducing grayscale and color images, each pixel of the spatial light modulator (e.g. 108 in FIG. 1) can be turned on and off at a rate faster than the human eyes can perceive such that the pixel appears to have an intermediate intensity proportional to the fraction of the time when the pixel is on. This method is generally referred to as pulse-width-modulation (PWM). Specifically, each image pixel of a grayscale image is represented by a plurality of pixel data bits (e.g. 4-bits, 8-bits, 16-bits, 32-bits, and 64-bits); and each pixel data bit is assigned a significance (also referred to as "weight of the bitplane"). Each time the pixel of the spatial light modulator is addressed, the value of the pixel data bit determines whether the addressed pixel is on or off, and the bit significance (weight) determines the time of the pixel at the on-state or the off-state. A collection of pixel data bits of the same significance for the image pixels is referred to as a bitplane. During a frame period, a number of bitplanes are displayed by the pixels of the spatial light modulator so as to produce grayscale levels of the desired image. It is noted that a bitplane can be a collection of pixel data bits for all or a portion of image pixels of the desired image. As a way of example as set forth in U.S. Pat. No. 6,201,521 to Doherty issued Mar. 31, 2001, the subject matter being incorporated herein by reference in its entirety, the pixel array of a spatial light modulator can be arranged into multiple reset groups. A set of groups of bitplanes is derived from an image to be displayed (the desired image) such that each bitplane corresponds to a reset group that displays said each bitplane; the bitplanes in each group have the same significance; and all bitplanes in each group collectively correspond to all pixel data bits having the same significance of the desired image.

At a particular time, bitplanes of the same group (having the same significance) can be displayed by the pixels of the spatial light modulator. Alternatively, bitplanes of the same group can be displayed at different time periods. In other words, the bitplanes being displayed by the pixels of all reset groups of the spatial light modulator at each time can be from the same group (of the same significance); or can be from different groups (of different significances).

Conversion of the pixels data (e.g. RGB data and YPbPr) of the incoming image or video signals into bitplane data can be performed in many ways, such as those set forth in U.S. Pat. No. 7,075,506 to Morgan, issued Jul. 11, 2006, U.S. Pat. No. 5,663,749 to Farris issued Sep. 2, 1997, and U.S. patent application Ser. No. 10/648,608 to Richards filed Aug. 25, 2003, the subject matter of each being incorporated herein by reference in its entirety. Such data conversion can be accomplished by a designated functional module, such as data processing unit 126, which can be a member of system controller 124 that is used to control operations of other functional members of the display system, as shown in FIG. 1. It is noted that the data processing unit can be a software module having a set of computer-executable instructions or an electronic circuit, such as a field-programmable-gate-array circuit, application-specific-integrated-circuit, and other suitable circuits.

Because different bitplanes (either having or not having the same significance) can cause different numbers of on-state and off-state pixels of the spatial light modulator, the amount of recycled off-state light varies over bitplanes for a given off-state light recycling mechanism. Such variation in turn causes unwanted illumination intensity changes on the screen in reproducing the desired image. As a consequence, the bitplanes derived from the desired image when displayed by the pixels of the spatial light modulator do not result in the desired image on the screen. This problem can be solved by many ways, one of which is to display the bitplanes at different clock speeds depending upon the number of off-states (or on-states) in the bitplanes. Specifically, bitplanes having different numbers of off-state pixels therein are displayed at different clock speeds in the spatial light modulator such that bitplanes having different number of off-state pixels (resulting in different amounts of recycled off-state light) can be displayed for different time periods so as to compensate for the illumination intensity variations due to the off-state light recycling. This bitplane displaying algorithm can result in that bitplanes of different image frames in a video content composed of image frames may be displayed for different time periods, even for the bitplanes with the same significance.

Figure 5:
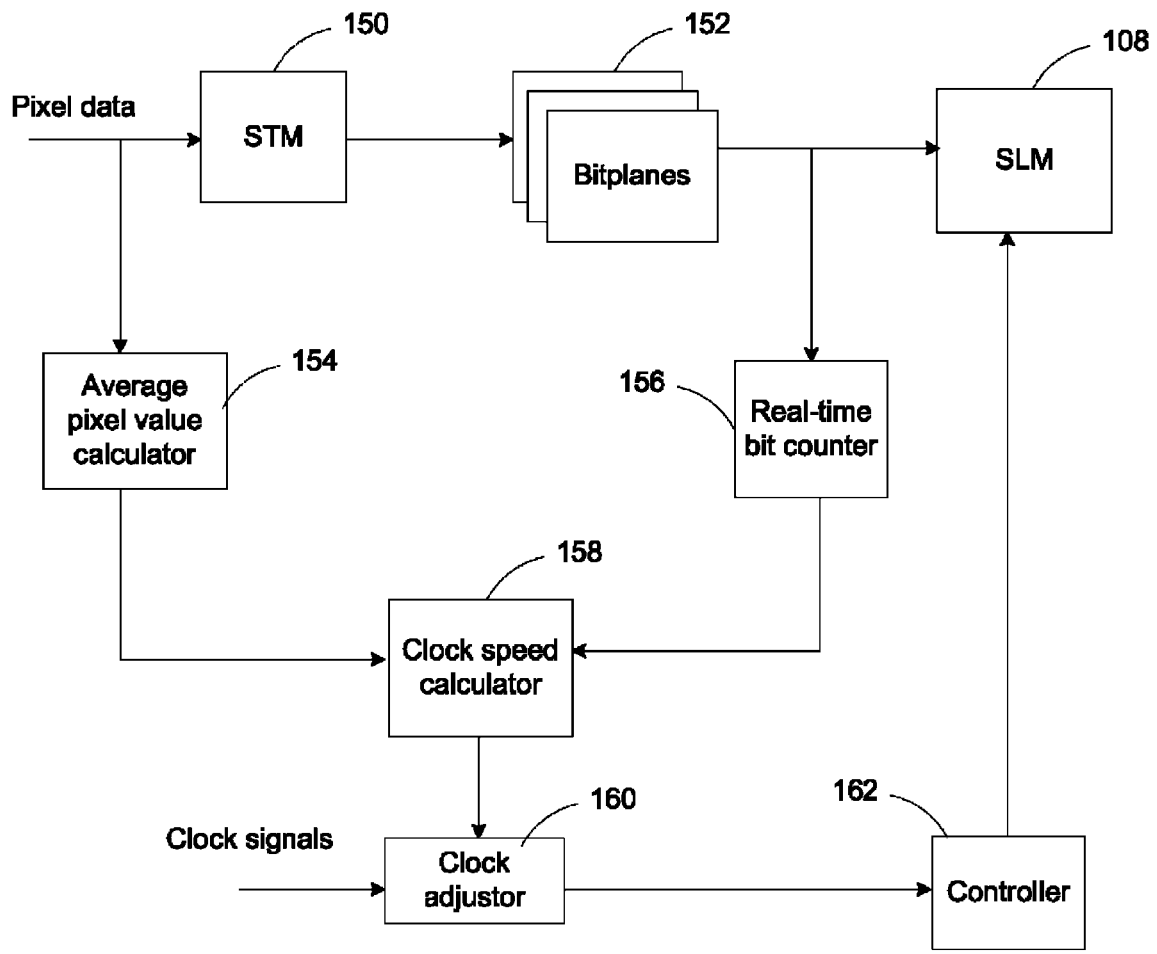
FIG. 5 demonstrates an exemplary system and method for displaying bitplanes with dynamically adjusted clock speed in the presence of off-state light recycling.

As an example, FIG. 5 is a diagram schematically illustrating an exemplary operation for displaying bitplanes at different clock speeds. Referring to FIG. 5, pixel data of a desired image is received by data formatter 150, which can be a spatial-temporal-multiplexing unit (STM), for formatting the received pixel data into bitplanes 152. An exemplary data formatter is set forth in U.S. Pat. No. 7,075,506 to Morgan, issued Jul. 11, 2006, the subject matter being incorporated herein by reference in its entirety. Other data formatting algorithms and technologies that convert image pixel data to bitplane data (or bitplanes) are also applicable. The pixel data can be in any desired formats, such as RGB data, CYM data, and YPbPr data. The formatted bitplanes can also be in any desired formats, such binary formats and non-binary-formats. When the input image is a color image having different color image components, a set of bitplanes is derived from each color image component. The derived bitplanes of the image are delivered to pixels of spatial light modulator 108; and the states (e.g. the ON and OFF-state for binary pixels) of the pixels are then set based on the values of the individual pixels in the delivered bitplanes.

In general, a display system has at least one clock that generates clock signals based on which operations of the functional members including pixels of the spatial light modulator of the display system can be synchronized; or operations of a functional member of the display system can be triggered. Accordingly, durations of the bitplanes in the pixels of the spatial light modulator can be varied by changing the clock speed. As a way of example wherein a bitplane is to be displayed for 4 time units at the first clock speed according its weight (significance), such bitplane however can be actually displayed for 8 time units at the second clock speed that is half the first clock speed; and can be displayed for 2 time units at the third clock speed that is twice the first clock speed.

For displaying bitplanes at different clock speeds while within a frame period, a pulse-width-modulation (PWM) sequence is designed such that the sequence can run in a time period T of $T_{frame} \times I_o/I_{max}$, which is shorter than the frame time $T_{frame}$, such as 1/(60 HZ); wherein $I_o$ is the intensity defined in equation 1; and $I_{max}$ is the maximum value of I as described in equation 1. In an example wherein the recycling efficiency $\epsilon$ is ⅔, $I_{max}$ is $3I_o$; and the time period T for the PWM sequence can be 16667/3=5556 microseconds. It is noted that the PWM sequence is referred to as a process of displaying the bitplanes derived from the image based on the PWM by the pixels of the spatial light modulator. In an example wherein displaying the bitplanes is accomplished through multiple steps, such as loading the bitplanes into the pixels of the spatial light modulator and resetting the pixels to states corresponding to the loaded bitplanes, the PWM sequence is referred to the process having the steps of loading the bitplanes and resetting the pixels of the spatial light modulators.

With the PWM sequence time that is shorter than the frame time, bitplanes can be displayed at different clock speeds without exceeding the frame time, wherein the clock speeds can be dynamically adjusted based on the number of off-state pixels in the bitplanes. As a way of example, the display time for each bitplane can be determined by equation 4 as expressed in the following:

$$C = \frac{C_o E}{1 - \varepsilon \frac{n_{off}}{N_{total}}} \quad \text{(Eq. 4)}$$

In equation 4, C is the adjusted clock speed; $C_o$ is the clock speed provided by the display system to the spatial light modulator; $n_{off}$ is number of off-state pixels in the bitplane or bitplanes (when multiple bitplanes are displayed at a time) being displayed by the pixels of the spatial light modulator; $N_{total}$ is the total number of pixels in the bitplane or bitplanes being displayed; $\epsilon$ is the recycling efficiency; and E is the time-stretch factor, which can be expressed in equation 5:

$$E = \epsilon(\Sigma t_i A_i) + (1-\epsilon) \quad \text{(Eq. 5)}$$

In equation 5, $t_i$ is the proportion of the time allotted to each color image component of the desired image (or image frame). Specifically, $t_i$ is defined as $T_i/T_{frame}$, wherein $T_i$ is the time allotted to the $i^{th}$ color image component (e.g. red color image component); and $T_{frame}$ is the frame time. Accordingly, $\Sigma t_i = 1$. $A_i$ is the average pixel value of the $i^{th}$ color image component in linear light space after de-gamma has been applied. $\Sigma(t_i A_i)$ represents the average total number of on-state pixels in the image during the frame period $T_{frame}$.

It can be observed from equation 4 that clock speed C is larger for bitplanes with more off-state pixels than for bitplanes with fewer number of off-state pixels. As a consequence, a first bitplane in one image frame may be displayed for a shorter time period than a second bitplane in another image frame when the first bitplane has more off-state pixels than the second bitplane even though the first and second bitplanes have the same weight (significance).

Calculating the clock speed and operating the spatial light modulator at the calculated clock speed can be accomplished in many ways, one of which is schematically illustrated in FIG. 5. As shown in FIG. 5, average pixel value calculator 154 is input pixel data of incoming images for calculating the average pixel value $A_i$ for each color image component of the input image; and forwarding the calculated $A_i$ to clock speed calculator 158. Before calculating the adjusted clock speed for the spatial light modulator, the number of off-state pixels in each bitplane is calculated by real-time bit-counter 156. As a way of example wherein the PWM sequence comprises a step of loading the bitplanes into pixels of the spatial light modulator and a step of resetting the pixels to states corresponding to the loaded bitplanes, the pixels of the spatial light modulator are divided into a multiple reset groups. A set of groups of bitplanes is derived from the desired image with each bitplane corresponding to a reset group. The bitplanes are loaded to the pixels of the spatial light modulator in reset groups; and the pixels are reset according to the loaded bitplanes. For demonstration purpose, FIG. 6 schematically illustrates an array of pixels of a spatial light modulator with the pixels in the array being divided into reset groups.

Figure 6:
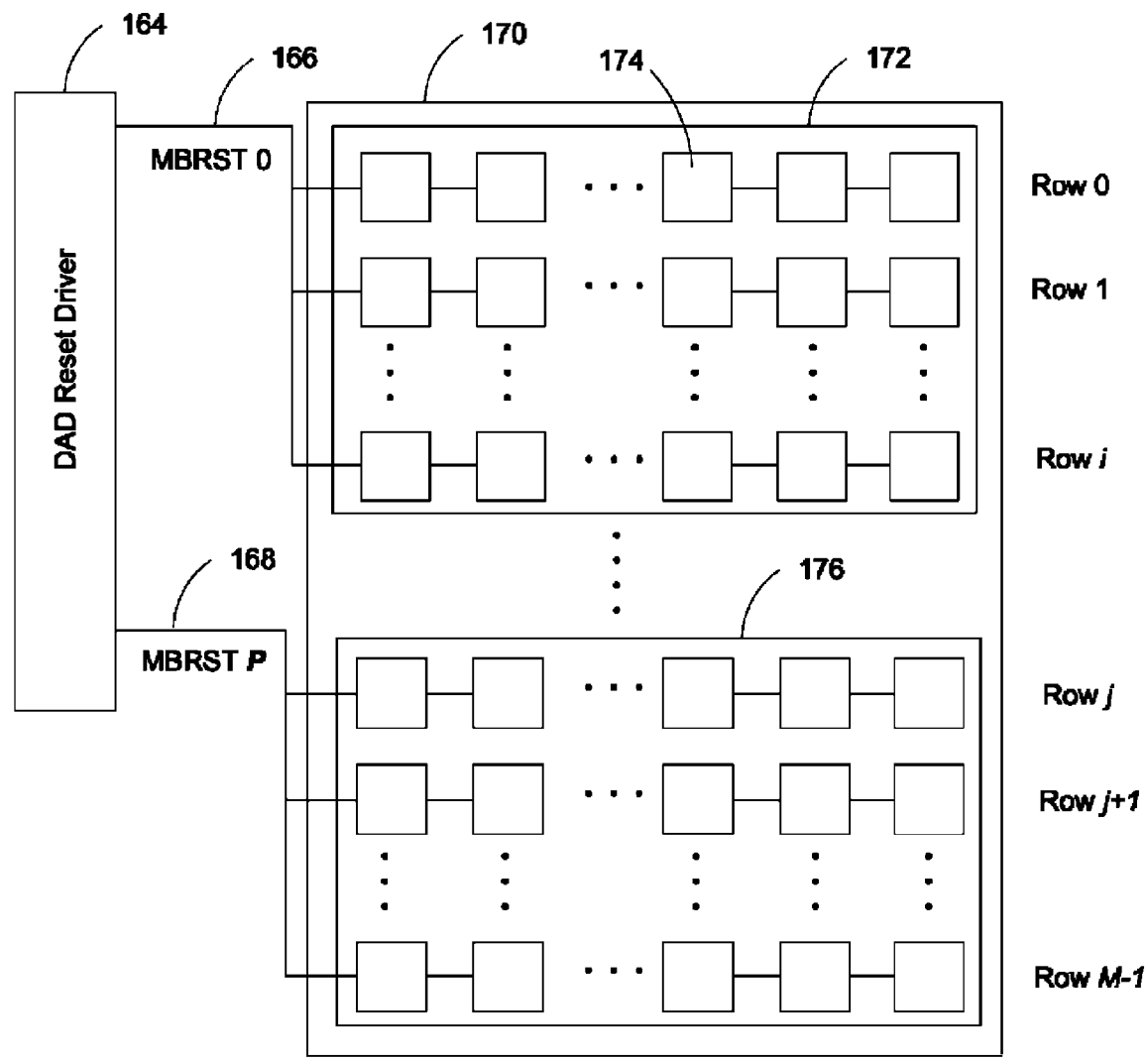

Referring to FIG. 6, pixel array 170 of a spatial light modulator, such as spatial light modulator 108 in FIG. 1, comprises an array of individually addressable pixels (e.g. pixel 174) that can be micromirrors, liquid-crystal-on-silicon, and other types of devices. The pixels are connected to a set of reset lines, such as reset lines MBRST 0 166 through MBRST P 168, through each of which reset signals can be delivered to the pixels. Upon receipt of the reset signals, the pixels are set to desired states. In this example, the entire pixel array is divided into multiple reset groups (e.g. reset groups 172 and 176); and each group is connected to a reset line. For example, pixels of reset group 172 are connected to reset line MBRST 0 166; and pixels of reset group 176 are connected to reset line MBRST P 168.

The pixels of the pixel array can be divided in many ways. For example, the pixels can be divided into groups with equal number of rows (or columns, or pixels or sub-blocks of pixels). As shown in the figure, assuming the pixels array has M rows, the pixel array can be equally divided into M/(i+1) groups with each group comprising (i+1) rows and i being 31 or any desired values. Pixels of each reset group are connected to one of a set of reset lines MBRST 0 to MBRST P. The reset lines are connected to reset driver 164, which can be a DAD reset driver by Texas Instrument, Inc.

Figure 7:
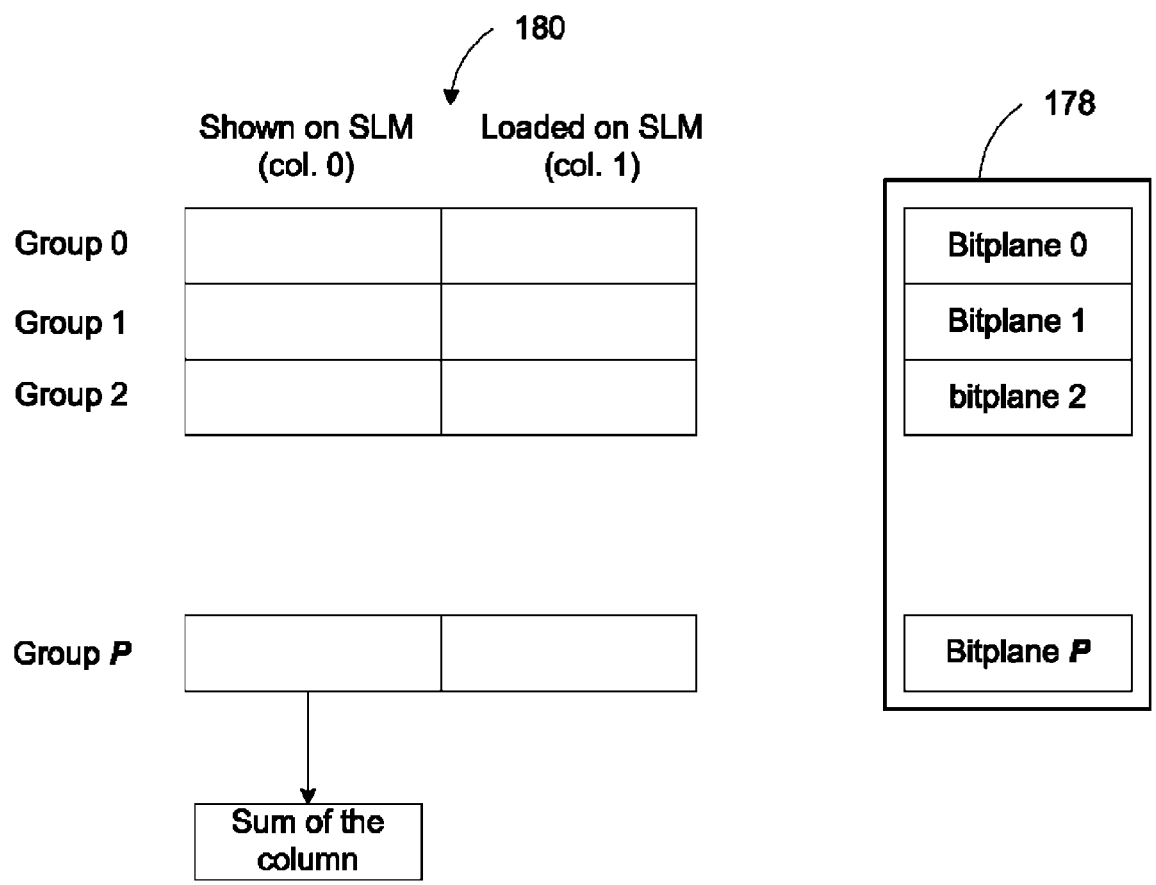

Given the pixel reset groups, bitplanes are loaded to the corresponding reset groups of pixels for being displayed. The number of off-state pixels in each bitplane being displayed by the pixels of the spatial light modulator can then be calculated, as schematically illustrated in FIG. 7. Referring to FIG. 7, at a particular time, a set of bitplanes 178 comprising bitplanes 0, 1, 2 through P are loaded and displayed by the pixels of the spatial light modulator. Each bitplane of the set of bitplanes 178 corresponds to a reset group of pixels numbered as reset group 0, 1, 2, through P, as shown in the figure. It is noted that the bitplanes numbered as 1 through P in this example may or may not have the same significance. Before counting the number of off-state pixels in the bitplanes being displayed by the pixels of the spatial light modulator, cells of column 1 of the counter table (180) are set to initial values, such as 0 or any other predetermined values. At each time a bitplane is loaded to a group of pixels of the spatial light modulator, the value of the corresponding cell in column 1 is incremented by 1 for each off-state pixel in the loaded bitplane. Taking an example wherein the reset group 0 of bitplane 0 has 20 off-state pixels, the cell corresponding to reset group 0 in column 1 of the counter table (180) has a value of 20 after bitplane 178 is loaded to the reset group 0 of the spatial light modulator. When the pixels of the reset groups (e.g. reset group 0) are reset based on the loaded bitplanes (e.g. bitplane 0), all values in the cells of column 1 of counter table 180 are shifted to the corresponding cells in column 0 followed by resetting the values of the cells in column 1 to their initial values. By summing up the values of cells in column 0, the total number of off-state pixels of the bitplanes being displayed by the pixels of the spatial light modulator can be obtained. This value is delivered to clock speed calculator 158 in FIG. 5.

In another example wherein a set of bitplanes is derived from the desired image with each bitplane being a collection of all pixel data bits of the same significance, calculation of the number of off-state pixels of a bitplane being displayed can also be performed using the counter table (180). Specifically, the counter table may be adapted such that each of columns 1 and 0 has one cell. After loading a bitplane to the entire array of pixels of the spatial light modulator, the cell in column 1 of the counter table (180) is incremented by 1 from its initial value for each off-state in the loaded bitplane. After the pixels of the spatial light modulator are reset based on the loaded bitplane, the value of the cell in column 1 can be shifted to the cell in column 0 followed by resetting the cell in column 1 to its initial value. The resulted value in the cell in column 0 is the total number of off-state pixels in the bitplane being displayed. Such obtained total number of off-state pixels is delivered to the clock speed calculator in FIG. 5.

It is noted that the above described off-state pixel calculation method using a counter table is only one of many possible ways. Many other methods using different counter tables or even without using a counter table are also applicable.

Referring again to FIG. 5, clock speed calculator 158 calculates the adjusted clock speed for the spatial light modulator using equations 4 and 5 with the calculated average pixel values $A_i$ and the number of off-state pixels $n_{off}$ in the bitplane or bitplanes being displayed. The calculated speed is sent to clock adjustor 160 that is capable of picking up the clock signals for the spatial light modulator and adjusting the clock signals based on the calculated speed from clock speed calculator 158. The adjusted clock speed is delivered to controller 162 that controls operations of the spatial light modulator (108) based on the received clock speed from clock adjustor 160.

Figure 8:
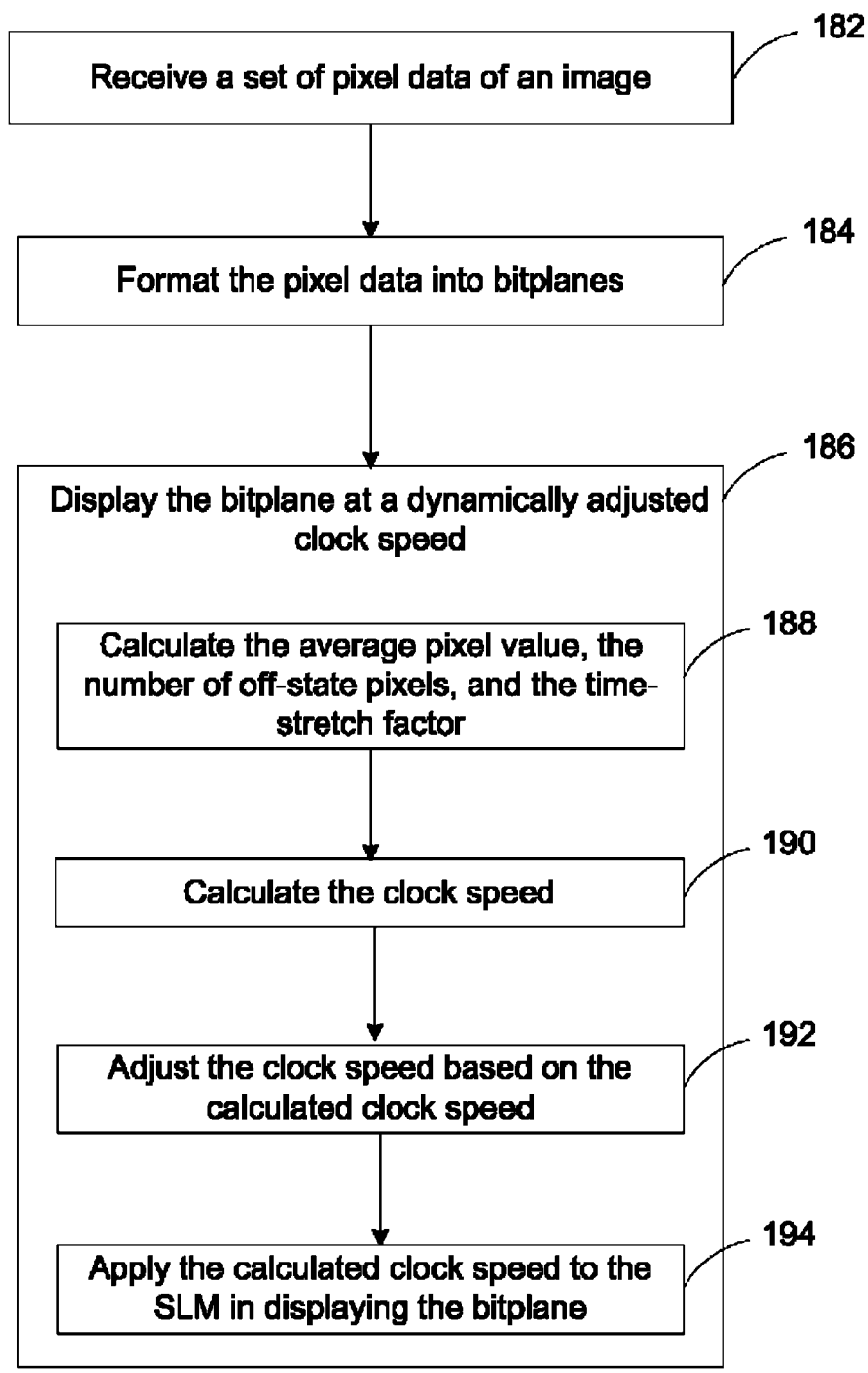
FIG. 8 is a flow chart having steps executed in displaying bitplanes with adjusted clock speed in the presence of off-state light recycling

As an example, FIG. 8 illustrates a flow chart having steps executed for displaying bitplanes at different clock speeds. Referring to FIG. 8, a set of pixel data of an image or an image frame of a sequence of video frames is received at step 182. The pixel data are formatted to a set of bitplanes according to a pre-determined bitplane format, such as binary and non-binary bitplane formats (step 184). Each set of bitplanes corresponds to a color image component when the input image is a color image. The set of bitplanes is then displayed by the pixels of the spatial light modulator at different clock speeds (step 186), which further comprises steps 188 through 194. At step 188, the average pixel value $A_i$ of each color image component (when the input image is a color image) or the average pixel value of the input grayscale image; the total number of off-state pixels $n_{off}$ in the bitplane or bitplanes being displayed by the pixels of the spatial light modulator; and the time stretch factor E are calculated. Given the above calculated average pixel value, total number of off-state pixels, and the time-stretch factor E, the clock speed for displaying the specific bitplane or a specific group of bitplanes (e.g. group 178 in FIG. 7) by the spatial light modulator is calculated based on equations 4 and 5. The clock speed to which operations of the spatial light modulator are synchronized to is adjusted at step 192. The adjusted clock speed is then applied to the spatial light modulator for displaying the specific bitplane. The above displaying process (step 186) is repeated for all bitplanes for each color image component; and for all bitplanes of all color image components. The process flows back to step 182 for the next input image.

It is noted that calculation of the average pixel value is independent from other calculations until the calculation of the time-stretch factor E at step 188, and can alternatively be performed at any time prior to step 188 wherein the time-stretch factor E is calculated but after step 182 wherein pixel data are received. For example, the average pixel value can be performed before formatting the pixel data into bitplanes (step 184) and after receipt of the pixel data (step 182).

It will be appreciated by those of skill in the art that a new and useful off-state light recycling mechanism and a pulse-width-modulation technique for use in display systems employing an off-state recycling mechanism have been described herein. In view of the many possible embodiments, however, it should be recognized that the embodiments described herein with respect to the drawing figures are meant to be illustrative only and should not be taken as limiting the scope of what is claimed. Those of skill in the art will recognize that the illustrated embodiments can be modified in arrangement and detail. Therefore, the devices and methods as described herein contemplate all such embodiments as may come within the scope of the following claims and equivalents thereof.

We claim:

1. A method for displaying an image, the method comprising:

directing a beam of incident light onto an array of pixels of a spatial light modulator, wherein each pixel is capable of being operated at a first state and a second state;

modulating the beam of incident light into a first portion of light by pixels at the first state and a second portion of light by the pixels at the second state based on a set of bitplanes, further comprising:

displaying each bitplane by the pixels for a time period that is determined based on a number of pixels in said each bitplane that cause the pixels of the spatial light modulator to the second state;

directing the first portion of light from the spatial light modulator onto a display target, and the second portion of light from the spatial light modulator away from the display target; and recycling the second portion of light back to the pixels of the spatial light modulator.

2. The method of claim 1, wherein the step of modulating the beam of incident light further comprises:

calculating an average pixel value of a set of pixel data of the image;

calculating said number of pixels in said each bitplane being displayed by the pixels of the spatial light modulator;

calculating a clock speed based on the calculated average pixel value and the number of off-state pixels; and operating the spatial light modulator in modulating the incident light based on said bitplane with the calculated clock speed.

3. The method of claim 2, wherein the step of calculating the said number of pixels in said bitplane is accomplished using a counter table that comprises first and second columns, further comprising:

determining a value of a cell in the second column based on said number of pixels in said each bitplane when said each bitplane is loaded to the spatial light modulator;

shifting the values of the cells in the second column to the cells of the same row in the first column; and summing the cell values of the first column to obtain said number of pixels.

4. The method of claim 2, wherein the steps of calculating the average pixel value, the step of calculating said number of pixels; and the step of calculating the clock speed are performed by a standalone software stored in a computer-readable medium having a set of computer-executable instructions.

5. The method of claim 2, wherein the steps of calculating the average pixel value, the step of calculating said number of pixels; and the step of calculating the clock speed are performed by an electronic circuit that is field-programmable-gate-array or an field-programmable-gate-array.

6. The method of claim 1, wherein the pixels of the spatial light modulator each comprise a reflective and deflectable mirror plate or wherein the spatial light modulator is a liquid-crystal-on-silicon panel.

7. The method of claim 6, wherein the micromirrors are operated at a binary mode that comprises an ON-state and an OFF-state; wherein the mirror plate has an ON-state angle at the ON-state with the mirror plate at a natural resting state; and the mirror plate has an ON-state angle at the ON-state with the mirror plate at a natural resting state; and wherein said first state is the ON-state; and said second state is the OFF-state.

8. The method of claim 7, wherein the ON-state and OFF-state angles have different absolute values.

9. The method of claim 7, wherein the ON-state and OFF-state angles have substantially the same absolute value.

10. The method of claim 6, wherein the incident light is substantially perpendicular to the surface of the mirror plate.

11. The method of claim 1, wherein the second portion of light is recycled using a recycling mechanism that comprises an optical integrator that comprises an open end for capturing said second portion of light and another end with a reflective internal surface.

12. A device for use in a display system employing a spatial light modulator having an array of pixels with each pixel capable of being operated at a first state and a second state that is different from the first state, the device comprising:

a data formatter capable of converting a set of pixel data of an input image into a set of bitplanes; and means for operating the spatial light modulator based on the set of bitplanes at a clock speed that is determined according to the input image and the set of bitplanes.

13. The device of claim 12, wherein said means for operating the spatial light modulator further comprises:

an average pixel calculator having an input connected to the input image for calculating an average pixel value of the input image;

a real-time bit counter having an input connected to the bitplanes for calculating a number of pixels in each bitplane that cause the pixels of the spatial light modulator to be at the second state;

a clock speed calculator having a set of inputs connected to an output of the average pixel value calculator and an output of the real-time bit counter for calculating a clock speed based on the calculated average pixel data value and said number of pixels in said each bitplane;

a clock speed adjustor having an input connected to an output of the clock speed calculator and an input coupled to a sequence of clock signals of the spatial light modulator provided by a clock of the display system; and a controller having an input connected to an output of the clock speed adjustor for operating the spatial light modulator at the adjusted clock speed.

14. The device of claim 13, wherein the average pixel calculator, the real-time bit counter, and the clock speed calculator are implemented in a stand-alone software stored in a computer-readable medium having a set of computer-executable instructions.

15. The device of claim 13, wherein the average pixel calculator, the real-time bit counter, and the clock speed calculator are implemented in an electronic circuit that is a field-programmable-gate-array or an application-specific-integrated- circuit.

16. The device of claim 12, wherein the spatial light modulator comprises an array of micromirrors or wherein the spatial light modulator is a liquid-crystal-on-silicon panel.

17. A display system, comprising:

a light source capable of providing a light beam;

a spatial light modulator having an array of individually addressable pixels each being capable of modulating the light beam into a first portion of light when said each pixel is at a first state and a second portion of light when said each pixel is at a second state based on a set of bitplanes;

a light recycling mechanism capable of recycling the second portion of light back to the spatial light modulator; and a system controller for controlling an operation of the spatial light modulator, further comprising:

a data formatter capable of converting the pixel data of the input image into the set of bitplanes; and means for operating the spatial light modulator based on the set of bitplanes at a clock speed that is determined according to the input image and the set of bitplanes.

18. The display system of claim 17, wherein the means for operating the spatial light modulator further comprises:

an average pixel calculator having an input connected to the input image for calculating an average pixel value of the input image;

a real-time bit counter having an input coupled to the bitplanes for calculating a number of pixels in each bitplane that cause the pixels of the spatial light modulator to be at the second state;

a clock speed calculator having a set of inputs connected to an output of the average pixel value calculator and an output of the real-time bit counter for calculating a clock speed based on the calculated average pixel data value and said number of pixels in each said bitplane;

a clock speed adjustor having an input connected to an output of the clock speed calculator and an input coupled to a sequence of clock signals of the spatial light modulator provided by a clock of the display system; and a controller having an input connected to an output of the clock speed adjustor for operating the spatial light modulator at the adjusted clock speed.

19. The system of claim 17, wherein pixels each have a reflective and deflectable mirror plate or wherein the spatial light modulator is a liquid-crystal-on-silicon panel.

20. The system of claim 17, wherein the recycling mechanism comprises an optical integrator that comprises an open end for capturing the second portion of light and another end with a reflective internal surface.

* * * * *